United States Patent Office 3,532,630
Patented Oct. 6, 1970

3,532,630
NICKEL-ZINC FERRITE CONTAINING LEAD SILICATE
Rudolf K. Tenzer, Martinsville, N.J., assignor, by mesne assignments, to Electronic Memories & Magnetics Corporation, Hawthorne, Calif., a corporation of Delaware
Filed Aug. 10, 1967, Ser. No. 659,779
Int. Cl. C04b *35/30*
U.S. Cl. 252—62.59                                  7 Claims

ABSTRACT OF THE DISCLOSURE

An improved sintered nickel-zinc ferrite material having an improved flatter temperature curve of permeability by virtue of the presence of inorganic silicate such as kaolin, bentonite, silica, lead silicate or lithium silicate in amounts of one to fifteen percent intimately within the sintered ferrite material. Six to eleven weight percent lead silicate is preferred since it gives a nearly flat temperature curve of permeability. In one form, the ferrite is a two phase system having a crystallite phase and a matrix phase with the inorganic silicate concentrated in the matrix phase.

BACKGROUND OF THE INVENTION

Field of the invention

This invention relates to soft ferrite having improved permeability properties and more particularly the invention relates to soft ferrites of the nickel-zinc ferrite type which are modified so as to provide a substantially flat temperature curve of permeability.

The terminology used in the specification

As is accepted to the art to which the present invention relates, this disclosure uses symbols to represent various art accepted terms. The symbols used herein and their meaning are as follows:

| Symbols | Meaning of Symbols |
|---|---|
| $\mu_i$ | Initial permeability. |
| Q | Quality factor, ratio of reactance to resistance for a coil containing the ferrite. |
| $T_C$ | Curie temperature, the temperature at which the ferrite loses its magnetic quality. |
| TC | The relative change of initial permeability per degree centigrade expressed as percent per degree centigrade, i.e., $TC = \frac{\Delta \mu_o}{\mu_o \Delta T} (\%/°C.)$ Calculation based on T at 25° C. |
| TF | The temperature coefficient divided by the effective permeability, i.e., $TF = \frac{\Delta \mu_o}{\mu_o^2 \Delta T}$ (p.p.m./°C.) |
| U.U.F. | Upper useful frequency = That frequency for which $\mu_o Q = \frac{\text{max. } \mu_o Q \text{ between 1 and 12 mc./c.}}{2.72}$ |

DESCRIPTION OF THE PRIOR ART

Nickel-zinc ferrites are soft ferrites which have found only limited use in tuned circuit applications because they tend to have highly unstable initial permeability over wide temperature ranges and have other instabilities such as a disaccommodation, influence of DC fields and AC drive sensitivity. On a practical basis the nickel-zinc ferrites usually contain from about 40 to about 60 mol percent ferric oxide based on total nickel, zinc and iron oxides and have a mol ratio of nickel:zinc oxides somewhere in the range of 0.5 to 3.0.

In general, nickel-zinc ferrites can be manufactured by mixing nickel oxide, zinc oxide and iron oxide with an organic binder, molding the mixture to the desired shape and thereafter sintering the mixture. The organic binder holds the material in the desired shape and burns out before sintering. The nickel oxide normally used is a commercial nickel oxide which contains cobalt oxide as a significant impurity.

SUMMARY OF THE INVENTION

The present invention relates to soft ferrite sintered bodies having improved initial permeability characteristics which are stabilized over a wide temperature range and also having stabilized disaccommodation and AC drive sensitivity properties and are stabilized against the influence of DC fields. More particularly, the invention relates to such ferrites and especially nickel-zinc ferrites which have improved properties by virtue of the addition to the ferrite of an inorganic silicate. The terms "inorganic silicate" or "silicate" where used herein refer to the silicates of any of the metals of the Periodic Table which have silicate salts, including those inorganic silicates which are naturally occurring as minerals. The inorganic silicate apparently functions as a densifier in the ferrite and in one form of the invention the silicate apparently creates a two-phase soft ferrite having a crystallite phase and a matrix phase with the silicate concentrated in the matrix phase.

DESCRIPTION OF THE PREFERRED EMBODIMENTS

Figure 1:
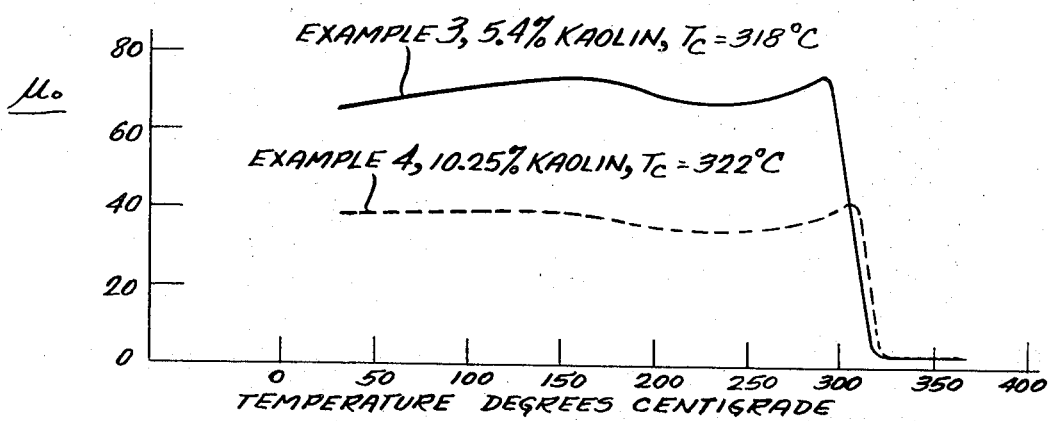
FIGS. 1 through 3 are plots of initial permeability against temperatures ranging from low temperatures up to and beyond $T_C$ for various examples of materials provided by this invention.

In the preferred form of the invention, the nickel-zinc ferrite has a fine homogeneous grain structure with grain size of about one micron or less. The silicate is present in the ferrite in an amount in a range of 1–15 weight percent, preferably 6–11 weight percent. Preferably the total iron content is near stoichiometric; in the most advantageous ferrites the iron content is in slight excess. Also, preferably the amount of divalent-iron in terms of FeO should not exceed about 0.5 weight percent of the total iron oxide.

The ferrites of the invention can exist as single phase ferrites or, in at least some cases of high silicate content, it has been noticed that the silicate apparently converts the ferrite to a two-phase system with the silicate concentrated in a matrix phase while the crystallite phase is low in silicate.

The especially preferred ferrites have properties which are very stable over an extended temperature range and have a nearly flat curve of initial permeability plotted against temperature over a temperature range from about $-20°$ C. to $85°$ C., i.e. $\pm.2$ percent change in this range.

A typical nickel-zinc ferrite having a $Fe_2O_3:NiO:ZnO$ mol ratio of approximately 50:30:20 was prepared for comparison with the ferrites of this invention according to the following procedure:

Preparation A

A nickel-zinc ferrite was prepared by calcining a mixture of ferric oxide, nickel oxide and zinc oxide powders at about 1200° C. The nickel oxide used was a high purity oxide prepared by calcining nickel formate, and the high purity nickel oxide contained only 0.1 weight percent or less of cobalt oxide and was a fine powder which was much more reactive than commercial nickel oxide. The calcined and ball milled slurry was dried and screened providing a soft powder. The organic binder, e.g. polyvinyl alcohol, was added as a 10% solution in water and mixed quickly and gently with the powder forming a soft, moist powder. The moisture content can vary but presence of some moisture is beneficial. The powder was immediately pressed to desired toroid form while it was in the moist condition and was then fired until sintered, i.e. at about 1200° C. The pressed and sintered material contained 48.9 mol percent ferric oxide, 30.9 mol percent nickel oxide and 20.2 mol percent zinc oxide. A number of sample toroids were prepared by this procedure having only small variances in properties and composition; and at times sintered at slightly different temperatures. These toroid samples will be referred to as Composition A.

The examples given hereinbelow are for the purpose of illustrating the principles of the present invention and are not intended as limitations on its scope.

EXAMPLES 1–10

The procedure of Preparation A was repeated in each of these examples except that the amounts of the ingredients listed below were added to the raw mix, and during firing a lower sintering temperature of about 1130° C. was usually used. The amounts are in weight percent based on the total metal oxide and listed ingredient content.

| Example: | Ingredient | Amount, wt. percent |
|---|---|---|
| 1 | Kaolin | 2.8 |
| 2 | do | 4.1 |
| 3 | do | 5.4 |
| 4 | do | 10.25 |
| 5 | Silica | 2.8 |
| 6 | do | 5.4 |
| 7 | do | 8.0 |
| 8 | Bentonite[1] | 2.8 |
| 9 | do[1] | 5.4 |
| 10 | do[1] | 10.25 |

[1] Bentonite typically contains about 52% $SiO_2$, about 19% $Al_2O_3$, about 0.8% iron, less than 4% CaO and MgO and up to 24% $H_2O$.

Again, in each of these examples, a number of sample toroids were prepared as discussed with respect to Composition A above. The high purity nickel oxide is preferred because cobalt impurities above about 0.1% in the nickel oxide increase such instabilities as influence of DC fields and the AC drive sensitivity.

One of the noticeable differences between the preparation of Composition A and the preparation of Examples 1 through 10 was that the powder formed in Composition A was not of a fine particle size while the powder formed in each of the examples was of such a fine particle size. This, and the addition of the silicates, permitted use of the lower sintering temperatures in the examples than the sintering temperature required in the preparation of Composition A. Thus, the silicate additions in Examples 1 through 10 permitted more complete densification of the material at lower temperatures, a desirable advantage. Also, in the examples, higher U.U.F. values were obtained and all additions improved the temperature behavior of $\mu_o$ compared with the basic composition as will be apparent from Table I below. Also, in the case of Example 10, the addition of 10.25 weight percent silicate gave the remarkable value of 2.3 p.p.m./° C. (TF value) and without serious loss of initial permeability. At the same time, the Q value was maintained at a reasonable level when compared with Composition A.

TABLE I

| Material | Ingredient | Addition, wt. percent | Density | U.U.F., mc./s. | U.U.F. $\mu_o Q$ | 5 mc./s. $\mu_o$ | 5 mc./s. Q | 12 mc./s. $\mu_o$ | 12 mc./s. Q | TF p.p.m./° C. |
|---|---|---|---|---|---|---|---|---|---|---|
| Comp. A | Kaolin | 0.0 | 4.03 | 13.4 | 47,300 | 72.1 | 123 | 80.9 | 57 | 28.6 |
| Ex. 1 | do | 2.8 | 4.75 | 13.5 | 59,600 | 96.6 | 88.4 | 101 | 55 | 17 |
| Ex. 3 | do | 5.4 | 4.40 | 20.5 | 58,150 | 62.0 | 88.0 | 64.8 | 71 | 18 |
| Ex. 4 | do | 10.25 | 4.40 | 39.0 | 61,700 | 35.5 | 100 | 39 | 93 | 9 |
| Ex. 5 | Silica | 2.8 | 4.76 | 16.2 | 56,000 | 79.1 | 87.3 | 83 | 63 | 15 |
| Ex. 6 | do | 5.4 | 4.65 | 28.2 | 62,300 | 53.6 | 88.3 | 57.6 | 65 | 10.4 |
| Ex. 7 | do | 8.0 | 4.42 | 43.0 | 74,450 | 44.6 | 93.3 | 47 | 75 | 12 |
| Ex. 8 | Bentonite | 2.8 | 4.69 | 19.2 | 62,900 | 73.3 | 89.2 | 75.2 | 69 | 15 |
| Ex. 9 | do | 5.4 | 4.69 | 21.5 | 68,800 | 73.0 | 96.6 | 69.2 | 81 | 6.6 |
| Ex. 10 | do | 10.25 | 4.67 | 22.1 | 66,650 | 52.3 | 130 | 55.7 | 95 | 2.3 |

Subsequent toroids of the above examples were also prepared, and it was found that the magnetic properties were reproducible. Also, in other toroids of these examples, fast firing techniques were used with temperatures of about 1200° C. for shorter periods of time; comparable materials were produced. In some of the subsequent batches, TF values, for example, were −0.7, −2.0 and −3.1 p.p.m./° C. The Q values obtained with the fast firing technique were higher, sometimes reaching near 190 at 5 mc./s. Stability of $\mu_o$ was improved over Composition A in some instances by a factor of more than five times and the disaccommodations instability was essentially negligible. The DC fields of AC drive effect were less detrimental to Q.

$\mu_o$ and Q values reported are the result of conventional measurements. For $\mu_o$ and Q measurements, toroids are measured with a General Radio Bridge. Number 30 gauge enameled wire is wound on toroids which are approximately 6 mm. in O.D. and 3 mm. in I.D. The number of turns is dependent on the frequency of measurement, but initially 20 turns are wound on the toroid. The value of $\mu_o$ measured is technically the effective $\mu_o$, but essentially it is the true value of $\mu_o$. The Q values measured are for coil and ferrite but are treated as apparent Q's of the material.

Figure 2:
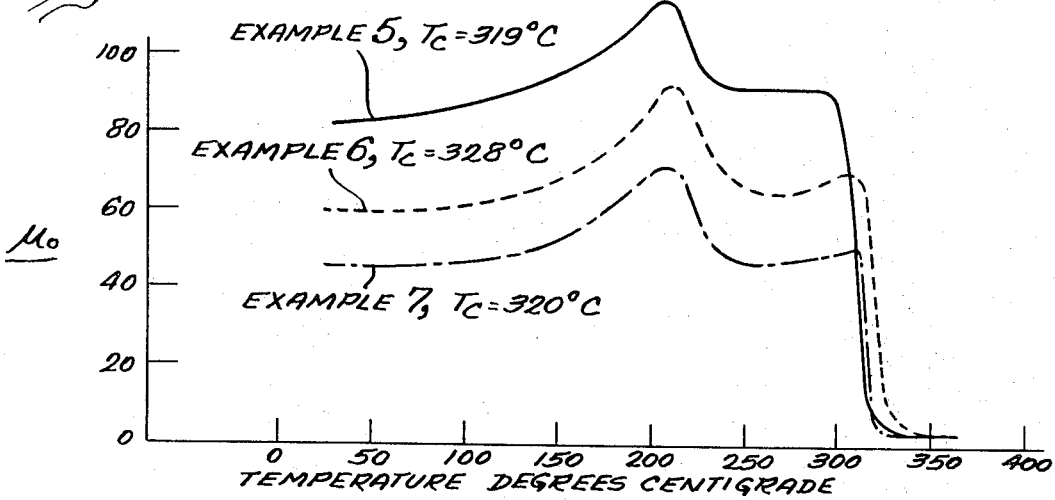
Figure 3:
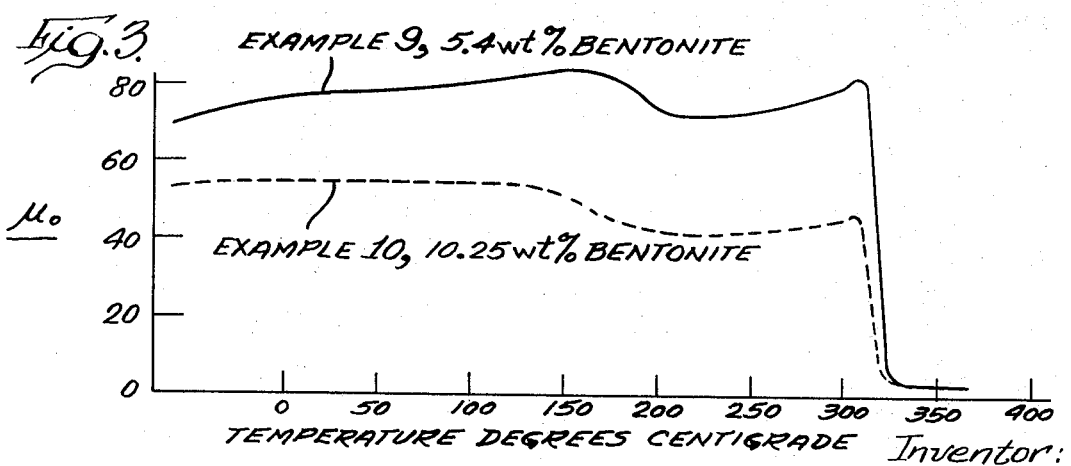
Figure 4:
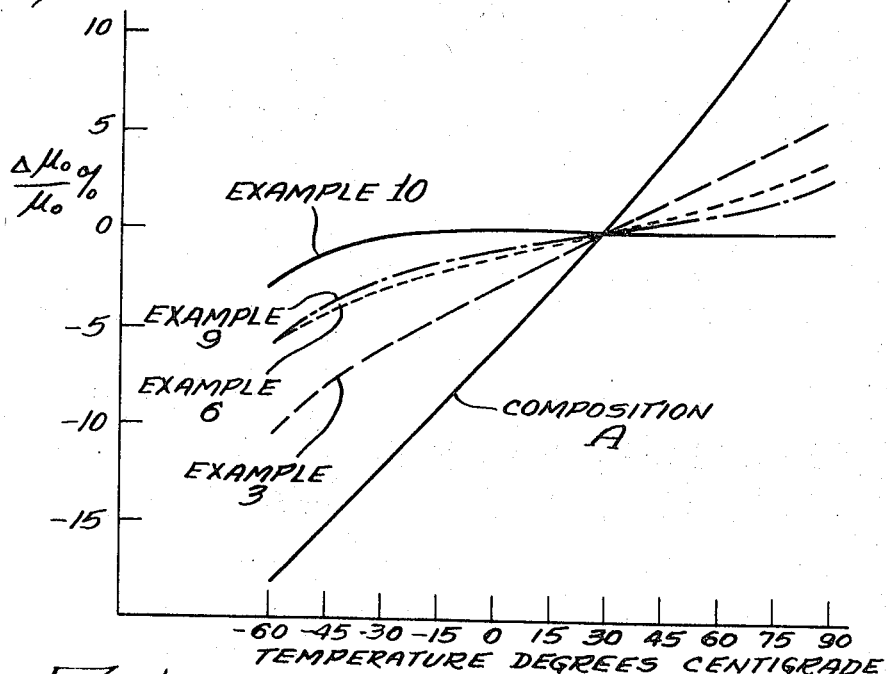
FIG. 4 is a plot of the percent change in initial permeability against temperatures ranging from $-60$ to $90°$ C. for several examples and a prior art composition.
Figure 5:
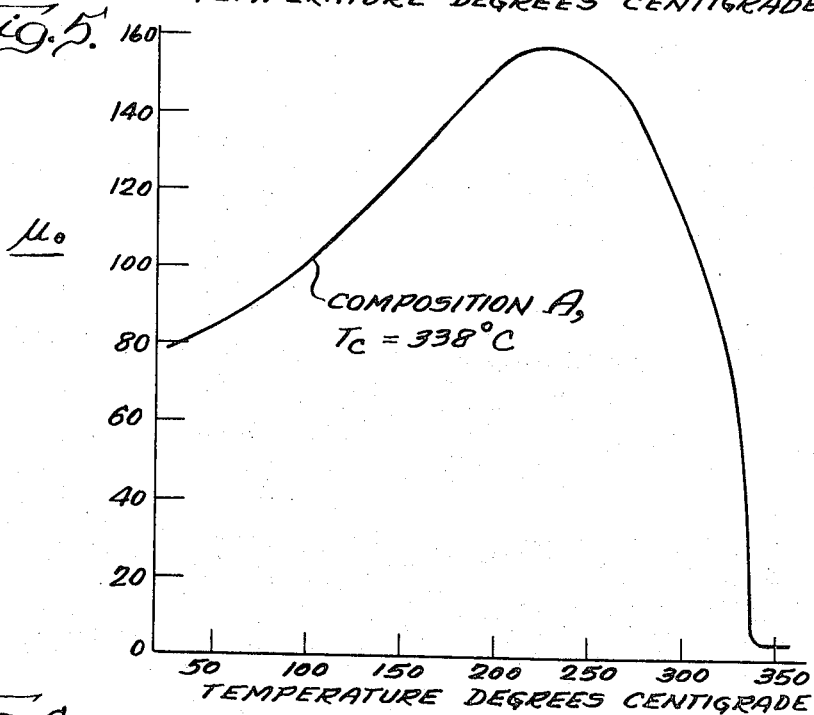
FIG. 5 is a plot of initial permeability against temperature through $T_C$ for a prior art composition.

Referring to FIGS. 1–3, it will be noted that in the examples of this invention the plot of $\mu_o$ against temperature is usually relatively flat up to $T_C$, particularly from −60 through about 150° C. or higher. Very good flatness and linearity of the curve usually occurs between −20 and 85° C. On the other hand, Composition A has a curve which is nowhere near flat; see FIG. 5. In FIG. 4, the more nearly level curve of percent change of $\mu_o$ against temperature is shown for the present ferrites when compared with Composition A.

EXAMPLES 11 THROUGH 14

A series of four compositions previously prepared according to the procedure of Example 10, each containing a 10.25 weight percent addition of bentonite were selected for study as exemplifying typical ferrites of the invention. Each of the selected samples had a different iron content and these samples, designated Examples 11 through 14, respectively, contained 41.08, 42.86, 43.45, 44.67 mol percent iron oxide respectively in regard to all constituents.

In regard only to the iron, nickel and zinc oxide content, the mol percent of iron oxide was 47.58, 49.37, 50.39, and 51.9, respectively. The behavior of Q against temperature for the toroid of each of these compositions was plotted and the toroid was then analyzed chemically for its divalent iron content. The FeO content was found to be 1.1, 1.9, 1.8 and 2.6 weight percent for Examples 11 through 14, respectively. Based on the studies of these samples and other samples prepared and tested, it was concluded that the ferrites preferably should have an iron content less than 0.5 weight percent for better stability of Q. Other components are reported in Table II below.

EXAMPLES 15 THROUGH 17

The procedure of Examples 1–10 was repeated substituting various amounts of lead silicate for the silicates used there. The amounts of lead silicate provided the various lead oxide contents reported for Examples 15–17 in Table II below. The lead silicate was a very effective fluxing agent, permitting better sintering at lower temperatures due to its much lower melting point. In each of these three examples, a ratio of PbO to $SiO_2$ which was near the bisilicate ratio was used since prior studies indicated that such a mix gave better magnetic properties. Studies have also shown that lead silicate in the range of 6 to 11 weight percent gives the most beneficial effect. A lesser amount produces gradually increasing Q values but steadily worsening temperatures curves of $\mu_0$ while higher amounts result in decreasing Q values and lower $\mu_o$ values.

TABLE II.—CHEMICAL COMPOSITION OF FERRITE MATERIALS OF EXAMPLES 11-17 (MOL PERCENT)

| Material | $Fe_2O_3$ | NiO | ZnO | $SiO_2$ | $Al_2O_3$ | PbO | MgO | CaO |
|---|---|---|---|---|---|---|---|---|
| Prep. A | 48.86 | 30.89 | 20.25 | | | | | |
| Ex. 11 | 41.13 | 26.38 | 18.21 | 10.38 | 2.79 | | .87 | .29 |
| Ex. 12 | 42.54 | 26.42 | 17.77 | 9.80 | 2.60 | | .66 | .22 |
| Ex. 13 | 43.49 | 25.39 | 17.42 | 10.18 | 2.64 | | .65 | .23 |
| Ex. 14 | 44.75 | 24.73 | 16.84 | 10.26 | 2.52 | | .67 | .22 |
| Ex. 15 | 44.99 | 28.03 | 18.70 | | | 2.05 | | |
| Ex. 16 | 44.70 | 28.66 | 19.24 | | | 2.20 | | |
| Ex. 17 | 42.58 | 27.58 | 18.64 | | | 3.41 | | |

Excellent high Q values are found, particularly at the higher frequencies, when the lead silicate content is between 6 and 11 weight percent. This was evident in the curves of $\mu_0$ Q versus frequency which were plotted for the three bodies obtained in Examples 15–17 from a strictly lead silicate addition. Q values in excess of 200 were measured at frequencies as high as 30 mc./s. The Q tends to drop off a little at the lower frequencies, e.g. below 5 mc./s., but their values are still reasonably good.

Figure 6:
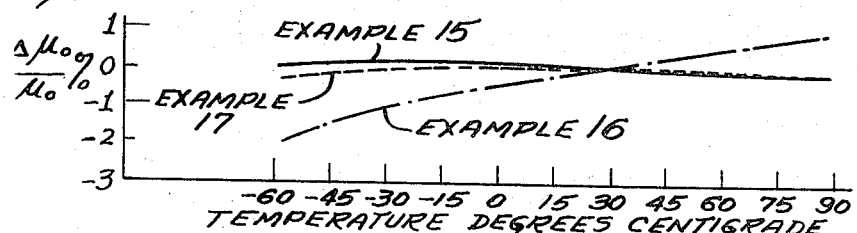
FIG. 6 is a plot of percent change in initial permeability against temperatures over the $-60$ to $90°$ range for certain ferrites of the invention.

Referring to FIG. 6, the temperature curves of $\mu_0$ for two of these bodies, Example 15 and Example 17, are very good, particularly for Example 17 which shows a TF of 0.0 p.p.m./° C. within a tolerance of ±0.2%. The low TF is probably due to the $SiO_2$ content. The $SiO_2$ content was 2.69, 3.22 and 4.0 weight percent for Examples 16, 15 and 17, respectively, and this can be correlated with the TF values which are respectively 7.4, 0.4 and 0.0 p.p.m./° C. For a similar body without $SiO_2$ but with ~5.3 weight percent PbO, the TF was found to be over 14 p.p.m./° C.

EXAMPLES 18 THROUGH 20

The procedure of Composition A is repeated adding the following amounts of lithium silicate to the slurry for each example:

| Example: | Wt. percent of lithium silicate based on total nickel, zinc and iron oxide |
|---|---|
| 18 | 5 |
| 19 | 7 |
| 20 | 9 |

The ferrites of Examples 18–20 also have good stability properties.

Figure 7:
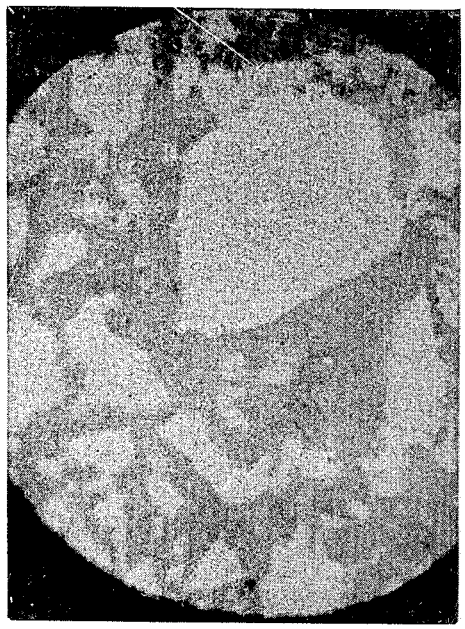
FIGS. 7 and 8 are photo micrographs made on a polished and etched sample of a large toroid of one of the ferrites prepared according to this invention.
Figure 8:
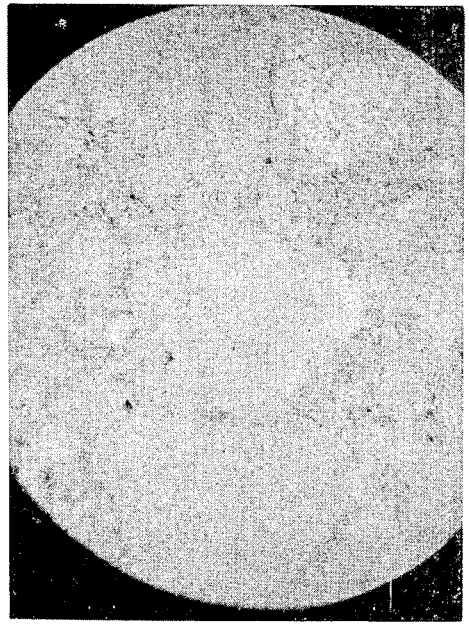

The physical structure and chemical composition of a ferrite of this invention was studied to see if silicate addition caused any detectable changes, i.e., the ferrite of Example 10. The study resulted in some evidence that the ferrite is apparently a two phase system including a crystallite phase and a matrix phase. Photomicrographs were made on a polished and etched sample of a large toroid of Example 10. This toroid was one which had been fired for 8 hours at 1130° C. Two of these photographs are shown in FIGS. 7 and 8. It appears from FIG. 7, there was a heavy etching action over a large area of the surface. Within this area there are many crystallites of irregular shape and inhomogeneous size which were apparently unaffected by the etchant. It appears as if crystallites of a high nickel-zinc ferrite composition are embedded in a matrix of a high silica content material. FIG. 10 is of the polished surface before etching, and it shows the body to be relatively dense.

Curie temperature curves, using $\mu_0$ as the measuring parameter, taken on several kaolin, bentonite, silica and alumina-containing bodies provided additional evidence of the two-phase system. These curves also give some insight as to where the Al and Si ions are going.

Consider the first graph of FIG. 4 which shows the Curie temperature curve for the Ni-Zn ferrite of Preparation A, there is a normal gradual increase of $\mu_0$ with increasing temperature and then a peak and sharp drop off to a value near unity. There are no irregularities in the curve. The Curie temperature determined from it is 338° C.

Referring now to FIGS. 1–3, these groups show the temperature curves for various additions of silica, bentonite and kaolin and specifically the materials of Examples 3–7, 9 and 10.

Seven curves are shown and their Curie temperatures determined range from 318° to 328° C. with an average value of 322° C. This is a very consistent result in view of the wide range of silica and alumina contents. Since only silica is the common ingredient in these three materials, and considering the drop in Curie temperature associated with these additions, of about 16° C., it would appear that some silica had entered the lattice of the crystallite material. Apparently only a limited amount of silica is allowed, however, or otherwise the Curie temperature would have dropped progressively as the silica content increased.

Al ions, where present, are apparently present in both phases. Their presence is indicated in the matrix phase by the fact that the peak occurring at about 210° C. in the $T_C$ curve on Preparation A to which 1.1 weight percent alumina was added, showed no change in the Curie temperature. This amount of alumina is equivalent to the amount in a 5.4 weight percent addition of bentonite. A strong indication that Al ions entered the crystallite lattice is the fact that the FeO content of Preparation A was increased from 0.37 to 1.2 weight percent upon the addition of 1.1 weight percent of alumina. A 100° C. increase in firing temperature was required to sinter this body, but the increase in FeO is not attributed solely to this. For another body whose iron content was near stoichiometric, the gain in FeO found for a 100° C. increase in temperature was about 0.25 weight percent. So, the amount of FeO found in the alumina containing body is about twice that to be expected by the increase in firing temperature. The increase in FeO content would be due to the Al ions entering the octahedral sites of the spinel lattice and thus forcing trivalent iron ions to tetrahedral sites. Acquiring the Al ions results in a shortage of oxygen ions and a disruption of the electron balance. This situation is forthwith resolved by a change in valence of the iron from trivalent to divalent.

The ferrite compositions of the above examples have high temperature stability characteristics. However, it has been noted that the silicate addition, although improving the temperature behavior of $\mu_o$, has also adversely affected the temperature behavior of Q. In a preferred form of the invention, lead silicate is used as the silicate and this has been found not only to provide the advantages of the other silicate materials but also to give higher Q values.

Cup cores for radio frequency application were prepared from the ferrites of this invention by forming the ferrite material to a slab shape, firing and then ultrasonically machining the cores from the fired slab. Cup cores, both gapped and ungapped, were made in this manner and measurements were taken and compared with toroids of the ferrite material. As regards $\mu_o$ and Q for toroid versus ungapped cup core shapes, the comparison is very favorable. The Q of the cup core can apparently be even a little higher than that of a toroid. Upon gapping the cup core, however, Q as well as $\mu_o$ were found to drop; the drop being greater as the gap increased.

The present ferrites find application in the manufacture of temperature stable cup cores and the like. Their linear and even nearly flat temperature curve of $\mu_o$ combined with their good disaccommodation stability, DC field influence stability and low AC drive sensitivity, makes these materials much more useful in high frequency applications. Although I do not intend to be held to any theories, it is believed that the silicate additions are effective because they locate preferably in the grain boundary and suppress or prevent magnetic interaction between the grains.

All percents given herein are percents by weight unless otherwise indicated.

The foregoing detailed description is given for clearness of understanding only and no unnecessary limitations are to be understood therefrom, as some modifications will be obvious to those skilled in the art.

I claim:

1. A soft magnetic nickel-zinc ferrite of sintered particles consisting essentially of said nickel-zinc ferrite and lead silicate in said ferrite in an amount in the range of 1 to 15 weight percent based on total nickel oxide, zinc oxide and iron oxide of said ferrite sufficient to improve the temperature dependence of initial permeability.

2. The ferrite of claim 1 wherein said lead silicate is present in an amount in the range of 6 to 11 weight percent.

3. The magnetic body of claim 1 wherein the nickel-zinc ferrite includes 40 to 60 mol percent iron oxide, and 40 to 60 mol percent total nickel oxide and zinc oxide with the mol ratio of nickel oxide to zinc oxide being in the range of 0.5:1 to 3:1.

4. The magnetic body of claim 3 wherein the iron oxide content is slightly in excess of the stoichiometric amount.

5. The magnetic body of claim 4 wherein the iron oxide includes divalent iron oxide and the divalent iron oxide content is less than 0.5 percent based on total ferrite.

6. The magnetic body of claim 1 in which the ferrite is a two-phase system including a crystallite phase and a matrix phase with said lead silicate concentrated in the matrix phase.

7. The body of claim 6 wherein said matrix phase has a grain size of about one micron or less and the distance between grains is less than one micron.

References Cited
UNITED STATES PATENTS

| | | | |
|---|---|---|---|
| 2,764,552 | 9/1956 | Buckley et al. | 252—62.59 |
| 3,450,635 | 6/1969 | Valentinovna | 252—62.62 |

TOBIAS E. LEVOW, Primary Examiner

R. D. EDMONDS, Assistant Examiner

U.S. Cl. X.R.

252—62.62, 62.63